United States Patent [19]

Holland et al.

[11] Patent Number: 5,513,293
[45] Date of Patent: Apr. 30, 1996

[54] OPTICAL BACKPLANE FOR A TELECOMMUNICATION DISTRIBUTION FRAME

[75] Inventors: William R. Holland, Ambler, Pa.; Richard J. Pimpinella, Hampton; Charles M. Schroeder, Wrightstown, both of N.J.

[73] Assignee: AT&T Corp., Murray Hill, N.J.

[21] Appl. No.: 346,439

[22] Filed: Nov. 29, 1994

[51] Int. Cl.⁶ .................................................. G02B 6/36
[52] U.S. Cl. ...................................... 385/134; 385/135
[58] Field of Search .................................. 385/134–137; 359/162, 163, 237

[56] References Cited

U.S. PATENT DOCUMENTS

| | | | |
|---|---|---|---|
| 5,129,030 | 7/1992 | Petrunia | 385/135 |
| 5,142,606 | 8/1992 | Carney et al. | 385/134 |
| 5,259,051 | 11/1993 | Burack et al. | 385/76 |
| 5,261,024 | 11/1993 | Allen et al. | 385/135 |
| 5,265,186 | 11/1993 | Fishkin et al. | 385/135 |
| 5,353,367 | 10/1994 | Czosnowski et al. | 385/134 X |
| 5,412,497 | 5/1995 | Kaetsu et al. | 385/134 X |
| 5,448,675 | 9/1995 | Leone et al. | 385/135 |
| 5,461,693 | 10/1995 | Pimpinella | 385/135 |

*Primary Examiner*—John D. Lee
*Assistant Examiner*—Phan T. H. Palmer

[57] ABSTRACT

An optical fiber distribution frame includes a plurality of shelf units, a modular array disposed within each shelf unit and having a plurality of modules for optically connecting to optical fiber jumper cables and an optical interconnection backplane mounted within each shelf unit. The optical backplane includes a fiber circuit having a plurality of optical fibers for interconnecting the fibers of an incoming cable to corresponding modules of the modular array. The fiber circuit is supported on a support member which is slidably mounted within the shelf unit to expose a splice storage area where the incoming cable and fiber circuit is connected. The individual optical fibers of the fiber circuit are routed for connection to respective modules by a fiber routing substrate. The fiber routing substrate defines a plurality of tab portions which sort and combine the respective fibers connected to each modular location. The tab portions are sufficiently flexible to permit live withdrawal of the support member, i.e., without disconnection of the modules.

15 Claims, 5 Drawing Sheets

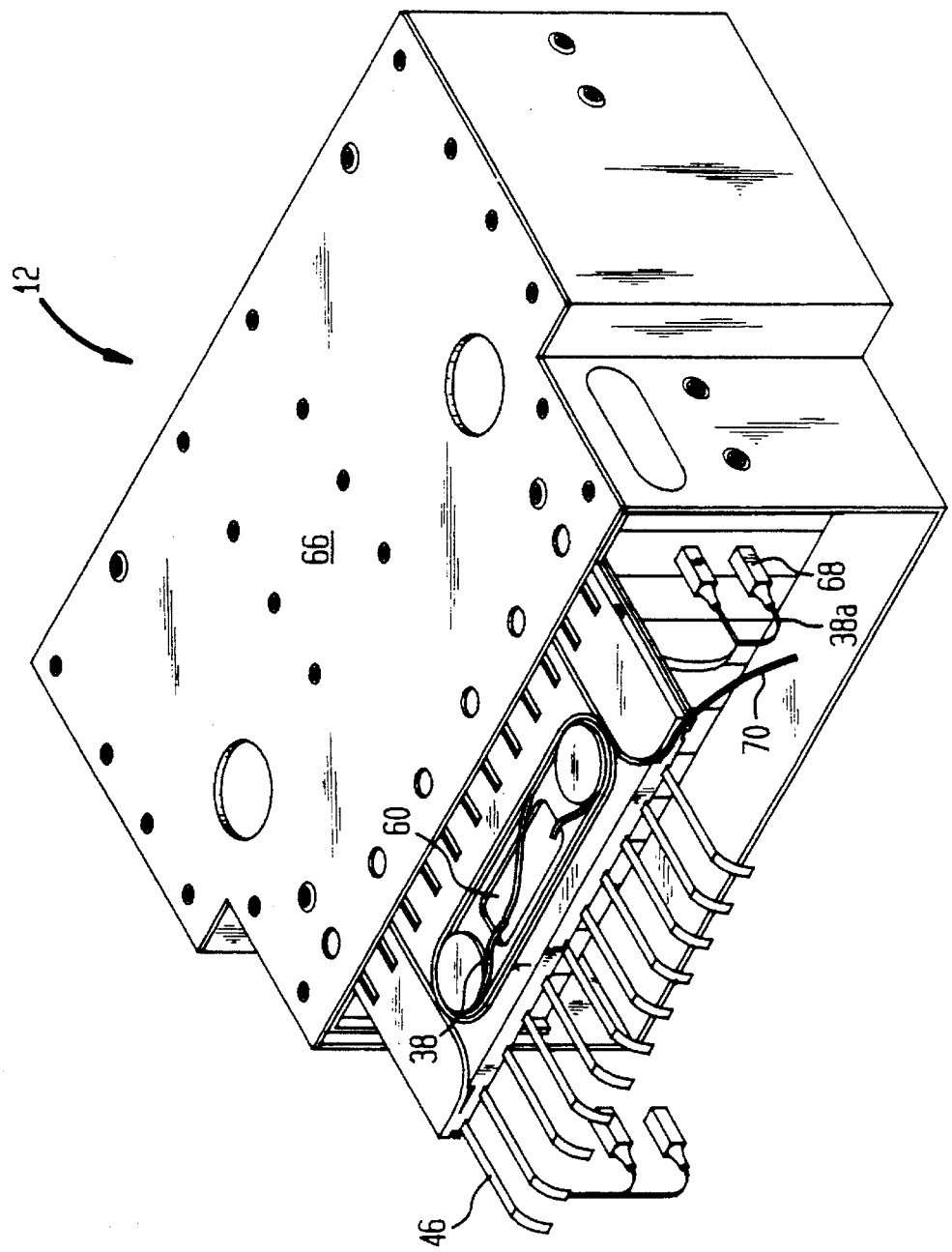

5,513,293

OPTICAL BACKPLANE FOR A TELECOMMUNICATION DISTRIBUTION FRAME

BACKGROUND OF THE INVENTION

1. Field of the Invention

The present invention generally relates to optical fiber distribution frames and, in particular, to a distribution frame incorporating an optical fiber management system which facilitates organization, interconnection and management of relatively dense fiber distribution frames.

2. Description of the Related Art

An optical fiber distribution frame serves in coupling incoming fiber optic cables to customer equipment. For example, in telecommunication systems, the distribution frame is an interface between optical fiber feeder (trunk) and distribution (transmission) cables. A conventional distribution frame includes a plurality of vertically stacked shelf units with each shelf unit containing arrangements for connecting, splicing and storing optical fiber cables, see, e.g., commonly assigned U.S. Pat. No. 5,129,030.

Due to the tremendous growth experienced over recent years in the telecommunication market as well as the increased rate of optical fiber development, management of the optical fibers within distribution frames has been of significant concern to telecommunication equipment designers. In particular, the ability to effectively organize the optical fibers in a manner which accommodates for fiber growth as well as providing ready accessibility of the fibers for monitoring, testing and/or splicing would greatly enhance the function and capability of existing distribution equipment.

AT&T's lightguide cross-connect (LGX®) distribution frame system has proven to be highly successful in meeting the aforementioned criteria of organization, protection and management within a central office environment. The building blocks of the LGX® system are modular frames and shelves that permit for growth with any application through an assortment of compatible hardware. However, emerging changes in the network are demanding enhancements of the LGX® systems, primarily to improve management of the fiber counts.

Accordingly, the present invention is directed to novel developments for improving the management and coordination of optical fibers in optical fiber distribution frames, particularly AT&T's LGX® fiber distribution system.

SUMMARY OF THE INVENTION

Generally stated, the present invention is directed to an optical fiber distribution frame including a plurality of shelf units, a modular array disposed within each shelf unit and having a plurality of modules for optically connecting to optical fiber jumper cables and an optical interconnection backplane mounted within each shelf unit. The optical backplane includes a fiber circuit having a plurality of optical fibers for interconnecting the fibers of an incoming cable to corresponding modules of the modular array. The fiber circuit is supported on a support member which is slidably mounted within the shelf unit to expose a splice storage area where the incoming cable and fiber circuit are connected. The individual optical fibers of the fiber circuit are routed for connection to respective modules by a fiber routing substrate. The fiber routing substrate defines a plurality of tab portions which sort and combine the respective fibers connected to each modular location. The tab portions are sufficiently flexible to permit live withdrawal of the support member, i.e., without disconnection of the modules.

BRIEF DESCRIPTION OF THE DRAWINGS

Preferred embodiment(s) of the invention are described hereinbelow with reference to the drawings wherein:

FIG. 5 is a perspective view similar to FIG. 4 with the optical interconnection backplane shown partially withdrawn from the shelf unit to permit access to the fiber circuit.

DETAILED DESCRIPTION OF THE PREFERRED EMBODIMENT(S)

Figure 1:
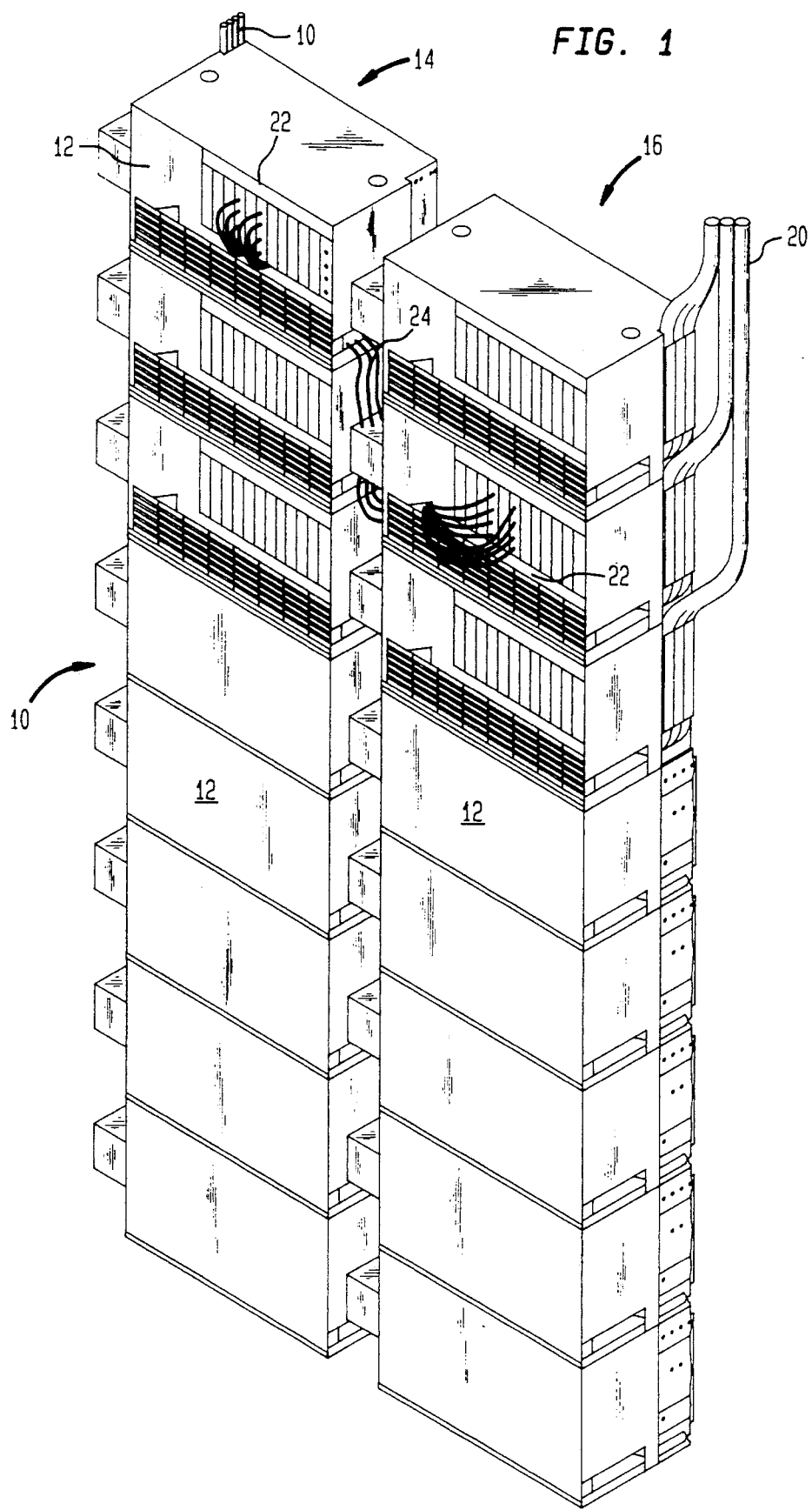
FIG. 1 is a perspective view of an optical fiber distribution frame incorporating the optical interconnection backplane of the present invention.

FIG. 1 illustrates a frontal perspective view an optical fiber distribution frame incorporating the optical organizational backplane of the present invention. The housing of distribution frame 10 is of conventional type and includes a plurality of vertically stacked shelf units 12 arranged in two columns 14, 16 as shown. For purposes of illustration, the doors of the top three shelf units of each column 14, 16 have been removed. As will be described hereinbelow, each shelf unit 12 contains structure for connecting, splicing and storing optical fiber cables. In a conventional application, a trunk cable 18 or a transmission cable 20 enters into frame 10 at the rear of the frame 10 and optical fibers from each cable are introduced into a respective shelf unit 12 through an aperture provided in the front or rear of the unit. In this example, each of the shelf units 12 in left hand column 14 has access to trunk cable 18 and each of the shelf units in right hand column 16 has access to the transmission cable 20.

Referring still to FIG. 1, each shelf unit 12 includes a plurality of modules 22 arranged in side by side relationship. Modules 22 ultimately connect optical fibers from trunk cable 18 with the fibers of transmission cable 20 via fiber jumper cables 24 connected to respective modules, e.g., for purposes of cross- connection between the cables. Modules 22 preferably possess passive and active optical devices to facilitate monitoring and testing of the optical fiber cable network. For example, modules 22 may include wavelength division multiplexers (WDMS) for the injection of test signals from a central optical time domain reflectometry (OTDR) or 10 db taps for shunting signals to monitoring devices. Commonly assigned U.S. patent application Ser. Nos. 08/255,621, filed Jun. 9, 1994, now U.S. Pat. No. 5,448,675, and 08/275,068, filed Jul. 14, 1994, now U.S. Pat. No. 5,461,693, the contents of each being incorporated herein by reference, disclose distribution frames consisting of modules of this type which have application in testing and monitoring optical fiber distribution systems.

Figure 2:
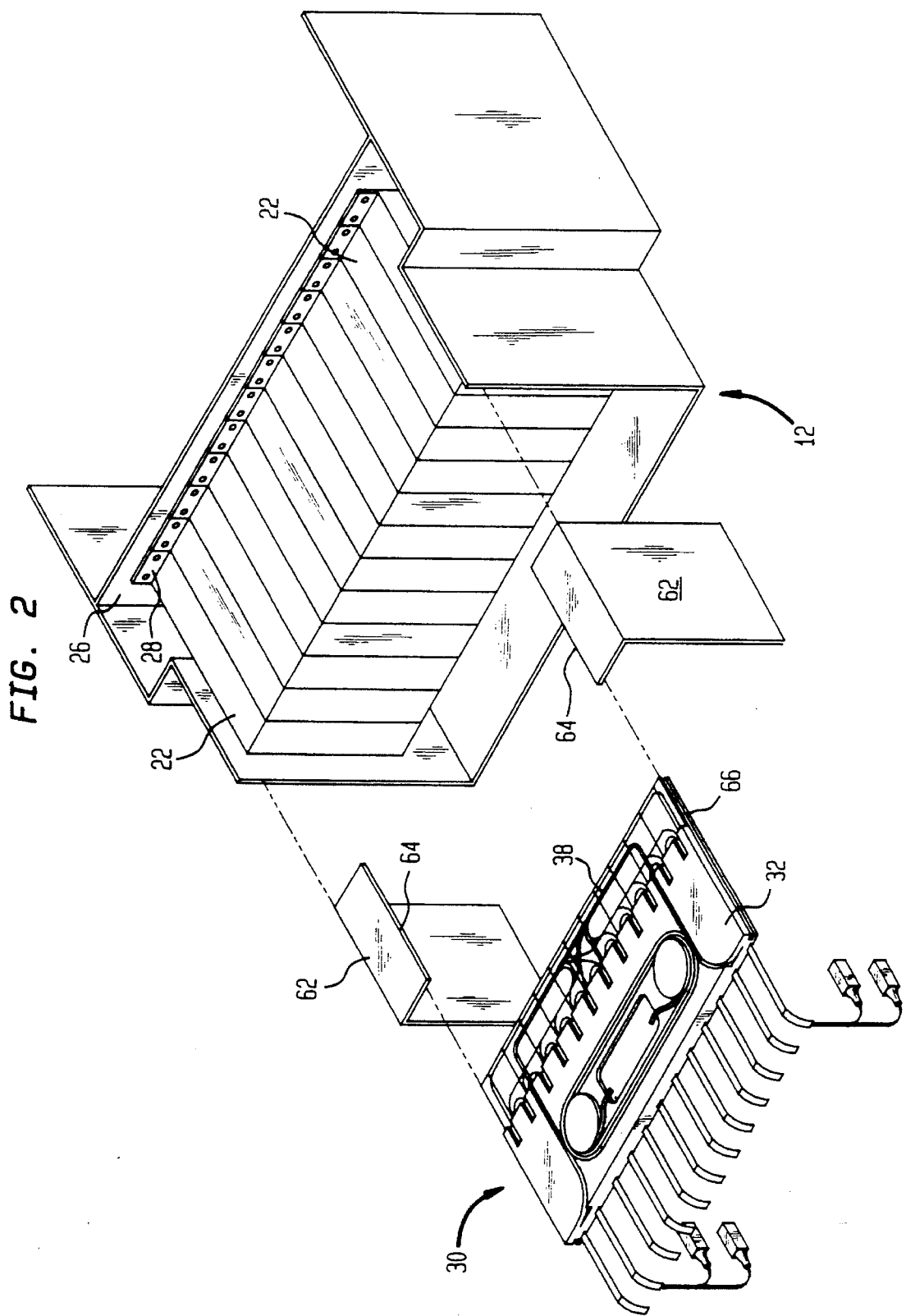
FIG. 2 is a perspective view with parts separated of a single shelf unit with the top plate removed illustrating the modules and optical interconnection backplane.

FIG. 2 illustrates in perspective view, the remaining components of shelf unit 12. The view provided in this figure depicts the rear end portion of shelf unit 12 with the top plate removed for illustration purposes. The preferred modular array includes twelve modules 22 which are mounted to bulkhead panel 26 traversing the length of shelf unit 12. Bulkhead panel 26 is standard in most conventional distribution frames for supporting optical fiber connectors and typically possesses a series of upper and lower apertures which receive the conventional connectors. In a preferred mounting method, the face plate portion 28 of each module 22 includes upper and lower mounting projections which are received within the existing upper and lower apertures of bulkhead panel 26 to mount the modules 22 within the shelf unit 12. Other methods for mounting modules 22 will be readily appreciated by one skilled in the art.

Figure 3:
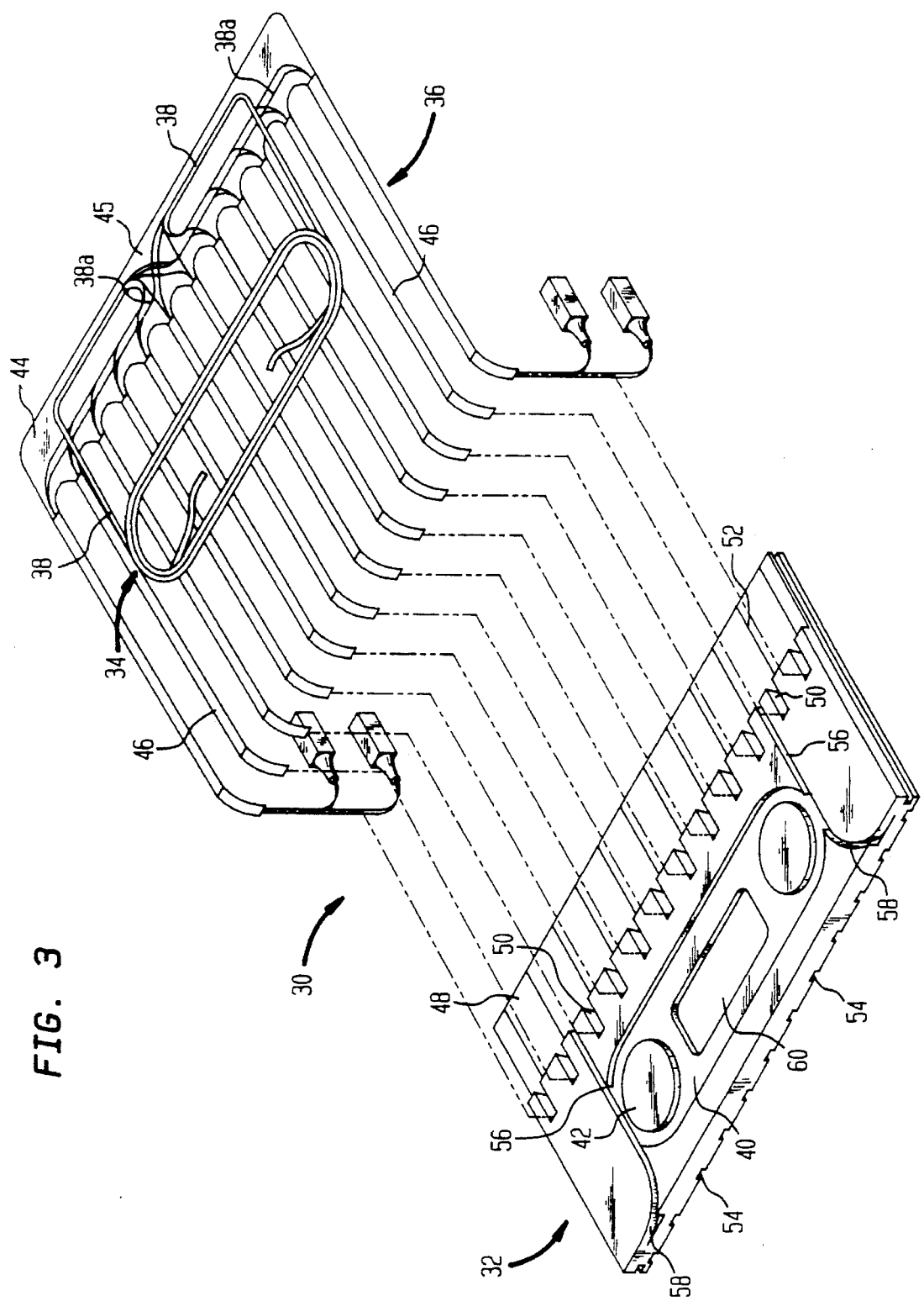
FIG. 3 is a perspective view with parts separated of the optical interconnection backplane illustrating the flexible fiber circuit, fiber routing substrate and support member.

Referring now to FIG. 3, in conjunction with FIG. 2, shelf unit 12 includes optical interconnection backplane, generally identified as reference numeral 30. Optical backplane 30 includes essentially three components, namely, support member 32, fiber circuit 34 and fiber routing substrate 36. Support member 32 is configured to support fiber circuit 34 and will be discussed in greater detail below. Fiber circuit 34 serves in interconnecting optical fibers of an incoming cable (not shown) with corresponding modules 22 of the modular array. In general, fiber circuit 34 includes a plurality of individual optical fibers which are connected to corresponding fibers of the incoming cable and are ultimately routed to their corresponding module locations. Preferably, fiber circuit 34 consists of a plurality of fiber ribbons 38. Fiber ribbons 38 may be of known type and include individual optical fibers 38a which are color coded to assist in the fiber routing. In this example, two 12-fiber ribbons 38 are provided whereby an individual fiber 38a from each ribbon 38 is connected to each of the twelve (12) modules 22, i.e., each module 12 requires two optical fiber connections.

The fiber ribbons 38 of fiber circuit 34 are at least partially stored in a racetrack configuration within an oval recess 40 formed in the upper surface of support member 32. In particular, fiber ribbons 38 are wrapped several times about storage drums 42 within the recess 40 and stored in a flat stacked or superposed relation within the recess 40. With this configuration, a sufficient amount of ribbon slack may be reserved, e.g., up to one meter, on support member 32 for splicing and other craft work.

The individual optical fibers 38a of fiber ribbons 38 fan out from the ribbon structure to their respective module locations via fiber routing substrate 36. Fiber routing substrate 36 may be formed by any conventional technique adaptable for routing optical fibers on a substrate such as manual routing or the method disclosed in commonly assigned U.S. Pat. No. 5,259,051, the contents of which are incorporated herein by reference. In general, the technique disclosed in U.S. Pat. No. 5,259,051 includes mechanically routing optical fibers on a substrate which is preferably fabricated from a flexible polymeric material such as Kapton® or Mylar® and encapsulating the routed fibers within a suitable coating. This method can be readily adapted to rout the individual optical fibers 38a so as to achieve the desired fiber "fan out".

Referring again to FIGS. 2–3, fiber routing substrate 36 defines a base portion 44 and a plurality of generally planar tab portions 46 extending from the base portion 44. Each tab portion 46 services a respective module unit 22. In particular, each tab portion 46 contains the corresponding optical fibers from the two ribbons 38, which are to be connected to a corresponding module location. Twelve tab portions 46 are provided, i.e., one for each module 22, and are arranged in general parallel relationship with each other.

Base portion 44 of fiber routing substrate 36 supports the individual optical fibers 38a extending from tab portions 46 and portions of fiber ribbons 38 extending from the ribbon storage area. The central area 45 of base portion 44 defines a fiber distribution area where the individual fibers 38a of each ribbon 38 "fan out" to their respective tab portion locations. Fiber routing substrate 36 is supported on support member 32 by base portion 44 which is positioned on the forward ledge portion 48 of support member 32. In this supported position of substrate 36, the individual tab portions 46 extend through corresponding apertures 50 provided in support member 32. Each aperture 50 has a corresponding loading slot 52 in communication therewith to facilitate loading of tab portions 46 within the aperture. In particular, during loading, tab portions 46 are slightly twisted so as to be introduced within their respective loading slots 52. Each tab portion 46 is thereafter advanced into position and accommodated within their respective aperture 50.

The underside of support member 32 includes a plurality of guide channels 54 in alignment with apertures 50. Guide channels 54 accommodate tab portions 46 to assist in maintaining proper spacing and orientation of the tab portions beneath support member 32 and to reduce the overall profile of optical backplane 30. Such reduced profile of backplane 30 permits unencumbered insertion and removal of the optical backplane and/or modules 22 from shelf unit 12. Support member 32 further includes two opposed ribbon channels 56 in its upper surface. Ribbon channels 56 accommodate portions of ribbons 38 extending from the ribbon storage area to fiber routing substrate 36. Incoming cable channels 58 are also provided on the upper surface of support member 32 to receive the incoming cables entering shelf unit 12. Support member 32 further includes a generally rectangular recessed area 60. Recessed area 60 functions as a splice or mechanical connection storage area where the incoming cable is connected with the fiber ribbon 38.

Referring particularly to FIG. 2, support member 32 is slidably mounted to shelf unit 12. In a preferred mounting method, two L-shaped brackets 62 are secured to opposed side walls of shelf unit 12 via screws or other conventional methods. L-shaped brackets 62 define edge portions 64 which are received within correspondingly dimensioned and configured grooves 66 formed in the side edges of support member 32. Support member 32 is capable of sliding in and out of shelf unit 12 via this bracket 62 and groove 66 structure to permit access to fiber circuit 34.

Figure 4:
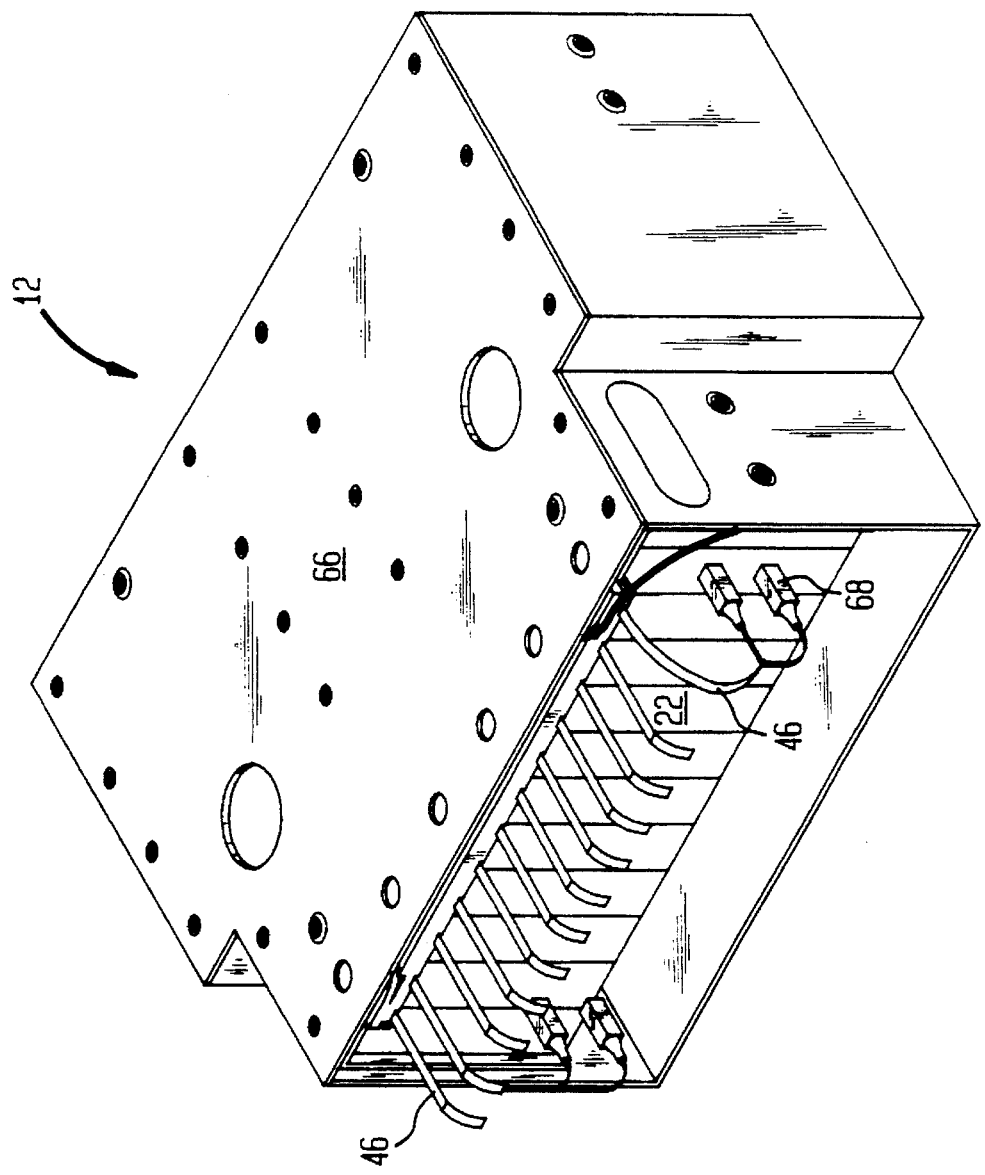
FIG. 4 is a perspective view of a single shelf unit illustrating the optical interconnection backplane fully positioned within the unit.

Referring now to FIGS. 4–5, there is illustrated optical interconnection backplane 30 mounted via the aforementioned bracket 62 and groove 64 structure within shelf unit 12. Optical backplane 30 is sufficiently compact to be positioned within a space defined between upper plate 66 of shelf unit 12 and the upper surface of the modular array. This is significant in that in AT&T's LGX® system, the electrical backplane is typically placed under the modular array, thus, the only space available is above the modular array.

In FIG. 4, optical backplane 30 is shown fully positioned within shelf unit 12. For illustrative purposes, only one module 22 is shown connected to fiber circuit 34 via conventional connectors 68 which are attached to fibers 38a, although, it is to be appreciated that each module 22 would be connected to the fiber circuit 34. Conventional connectors 68 are received within corresponding jacks (not shown) provided in the module.

FIG. 5 depicts the optical backplane 30 partially withdrawn from shelf unit 12 to permit access to the splice storage area defined by rectangular recess 60 of support member 32. Withdrawal of optical backplane 30 enables the technician to access the end portions of the fiber ribbons 38 and the incoming cable which enters through channel 58 of support member 32 for splicing or other craft work. As detailed in FIG. 5, the flexible configuration of tab portion 46 maintains the optical connection 778 with its respective module 22, thus permitting "live" withdrawal of optical backplane 30.

Thus, the optical organizational backplane of the present invention is an effective approach for organizing and managing dense fiber distribution frames. The optical backplane is easily scalable to accommodate higher fiber counts as capacity grows. As more capability is included into each module, there may be a need of sending more fibers into each module as is easily accomplished with the tab and routed fabric design.

While the above description contains many specifics, these specifics should not be construed as limitations on the scope of the invention, but merely as an exemplification of a preferred embodiment thereof. Those skilled in the art will envision other possible variations that are within the scope and spirit of the invention as defined by the claims appended hereto.

What is claimed is:

1. An optical fiber distribution frame, which comprises:
   a plurality of shelf units;
   a modular array disposed within each said shelf unit and having a plurality of modules for optically connecting to optical fiber jumper cables; and
   an optical backplane mounted within each said shelf unit, said optical backplane including a flexible fiber circuit having a plurality of individual optical fibers at least partially mounted to a substrate and being routed to corresponding optical modules of said modular array, said optical fibers connectable at first ends thereof to optical fibers of an incoming cable and at second ends thereof to corresponding modules of said modular array.

2. The optical fiber distribution frame according to claim 1 wherein said optical backplane includes a support member for at least partially supporting said substrate and said flexible fiber circuit.

3. The optical fiber distribution frame according to claim 2 wherein said support member is slidably mounted to said shelf unit such that said support member may be at least partially removed from said shelf unit to permit access to said flexible fiber circuit.

4. The optical fiber distribution frame according to claim 3 wherein said optical backplane is positioned within a space defined between an upper panel of said shelf unit and said modular array.

5. The optical fiber distribution frame according to claim 2 wherein said fiber substrate includes a plurality of tab portions, each said tab portion associated with an individual module to route corresponding optical fibers of said fiber circuit to said individual module.

6. The optical fiber distribution frame according to claim 5 wherein said substrate comprises a flexible polymer.

7. An optical fiber distribution frame, which comprises:
   a plurality of shelf units;
   a modular array disposed within each said shelf unit and having a plurality of modules for connecting to optical fiber jumper cables; and
   an optical backplane mounted within each said shelf unit, said optical backplane including:
   a support member;
   a flexible fiber circuit including a plurality of optical fibers at least partially supported by said support member for connecting optical fibers of an incoming cable to corresponding modules of said modular array; and
   a fiber routing substrate for facilitating routing of said optical fibers of said fiber circuit to said modules of said modular array, said fiber substrate including a base portion and a plurality of tab portions extending from said base portion, wherein each said tab portion is associated with an individual respective module, said tab portions directing said optical fibers of said fiber circuit to corresponding modules of said modular array.

8. The optical fiber distribution frame according to claim 7 wherein said support member includes a recessed region defining a generally racetrack configuration for accommodating at least a portion of said flexible fiber circuit.

9. The optical fiber distribution frame according to claim 8 further including means for slidably mounting said optical backplane to said shelf unit wherein said optical backplane can be at least partially removed from said shelf unit.

10. The optical fiber distribution frame according to claim 7 wherein said support member includes a second recessed region defining a connection storage area where at least one incoming cable is connected to said fiber circuit.

11. The optical fiber distribution frame according to claim 7 wherein said fiber routing substrate is supported by said support member.

12. The optical fiber distribution frame according to claim 11 wherein said support member includes a plurality of apertures formed therein, each said aperture associated with an individual tab portion and dimensioned to permit passage of said tab portion through said support member for connection to a respective module.

13. An optical fiber distribution frame, which comprises:
    a plurality of shelf units;
    a modular array disposed within each said shelf unit and having a plurality of modules arranged in side by side horizontal relation for connecting to optical fiber jumper cables; and
    an optical backplane mounted within a space defined between said modular array and one of an upper and lower surface of each said shelf unit, said optical backplane including a support plate slidably mounted within the space and a fiber fabric at least partially supported by said support plate, said fiber fabric having a plurality of optical fibers connectable at first ends thereof to corresponding optical fibers of an incoming ribbon cable and at second ends thereof to corresponding individual modules of said modular array.

14. The optical fiber distribution frame according to claim 13 wherein said fiber fabric of said optical backplane is at least partially mounted to a flexible substrate, said substrate including a base portion and a plurality of tab portions extending from said base portion, each said tab portion associated with an individual module to rout corresponding optical fibers of said fiber fabric to said individual module.

15. The optical fiber distribution frame according to claim 13 wherein each said shelf unit includes a pair of opposed mounting plates defining mounting edges, said mounting edges received within correspondingly dimensioned and configured mounting grooves formed in side edges of said support plate to slidably mount said support plate to said shelf unit.

* * * * *